United States Patent Office 3,491,165
Patented Jan. 20, 1970

3,491,165
ORGANOPOLYSILOXANE COMPOSITIONS CONVERTIBLE INTO TRANSPARENT ORGANOSILOXANE ELASTOMERS
Klaus Seyfried, Cologne, Klaus Damm, Wuppertal-Donberg, and Walter Noll, Opladen, Germany, assignors to Farbenfabriken Bayer Aktiengesellschaft, Leverkusen, Germany, a corporation of Germany
No Drawing. Filed Oct. 18, 1967, Ser. No. 676,050
Claims priority, application Germany, Oct. 28, 1966, F 50,558
Int. Cl. C02f 9/00
U.S. Cl. 260—825         10 Claims

ABSTRACT OF THE DISCLOSURE

Clear transparent elastomers especially useful as embeddings are produced by admixing a platinum catalyst with an organopolysiloxane composition essentially consisting of a vinyldimethylsiloxy terminated linear diorganopolysiloxane, a methyl-diallylsiloxy terminated linear diorganopolysiloxane, an allyl-methyl cyclotrisiloxane or cyclotetrasiloxane, and a trimethylsiloxy terminated linear methyl-hydrogen lower polysiloxane.

---

This invention relates to organopolysiloxane compositions and especially to liquid organopolysiloxane mixtures which can be cross-linked to give water-clear elastomers. Such mixtures are of considerable use as pourable sealing compounds for embedding sensitive structural units of electrical devices, known in the art as "potting" compounds, their transparency enabling the fault to be located, in the case of disturbances occurring in such devices, before any action is taken.

It is known, for example from U.S. patent specification No. 3,284,406, to use as potting compounds casting compositions of linear diorganosiloxane polymers having terminal, olefinically-substituted units, e.g. vinyl-dimethyl-siloxane units, organo-hydrogen-polysiloxanes and resinous organopolysiloxanes, i.e. organopolysiloxanes which consist to a considerable extent of tri- or tetrafunctional siloxane units and are partly olefinically-substituted, in admixture with a platinum catalyst. The function of the resinous component in casting compositions of this type is to impart to the elastic substance formed therefrom by cross-linking addition reactions a sufficient solidity which can otherwise only be achieved for organosiloxane elastomers by the use of active fillers with resultant loss of transparency.

However, these resinous siloxane components have proved, in practice, to be an inconvenient source of defects, since it is very difficult, on account of their cumbersome production, to reproduce a definite structure found to be satisfactory. Due to the complicated and unpredictable condensation reactions and the multiplicity of structural possibilities of such resins, considerable variations of quality, which have an effect on the solidifying process in the sealing composition and on its mechanical behaviour in a manner which cannot be predetermined, have to be taken into account, even when taking the greatest care. The known casting compositions have therefore a very substantial disadvantage which it is the object of the present invention to obviate.

According to the present invention an organopolysiloxane composition convertible upon admixture with a platinum catalyst into a clear, transparent elastomer, containing olefinically-substituted polysiloxanes and methyl-hydrogen-polysiloxanes and especially suitable as a potting compound for embedding or encapsulating sensitive electrical structural units, comprises (a) 100 parts by weight of an α,ω-bis-(vinyldimethylsiloxy)-polydiorganosiloxane of the general formula

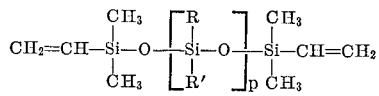

in which R and R' (same or different) are hydrocarbon radicals which are free from aliphatic multiple bonds, or are halogen derivatives thereof, and p is a number having such a value that the viscosity of the polysiloxane is at least 1000 cp. at 20° C.; (b) 5 to 15 parts by weight of an α,ω-bis-(methyl-diallylsiloxy)-polydiorganosiloxane of the general formula

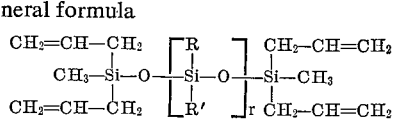

in which R and R' are as above and r is a number having a value such that the polysiloxane has a viscosity between 5 and 200 cp. at 20° C.; (c) 5 to 15 parts by weight of an allylmethyl-cyclopolysiloxane of the general formula

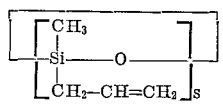

in which s is 3 or 4; and (d) an α,ω-bis-(trimethylsiloxy)-polymethyl-hydrogen-siloxane of the general formula

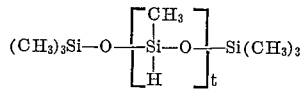

in which t is an integer from 2 to 5, in such an amount that the molar ratio of the HSi(CH₃)O-units to the olefinic hydrocarbon radicals in the whole composition is 0.7:1 to 1.5:1.

It is not necessary that component (c) be pure; it is only necessary that it consist of at least 50 percent of its weight of the specified cyclotri- and cyclotetrasiloxanes. The remainder may be an impurity not accurately determined, e.g. caused by the production, consisting of cyclopenta- to cyclohepta-siloxanes and open chains of less than 200 siloxane units terminated by HO—, RO— or methyl-diallylsiloxyl radicals, care being taken, however, that the viscosity of the whole component (c) does not exceed 100 cp. at 20° C. The last mentioned open siloxane chains may also contain minor amounts of CH₃SiO₃/₂ units; if sporadic branchings thus occur, these are immaterial for the advantageous behaviour of the casting compositions of the invention.

As the hydrocarbon radicals R and R' in the above formulae, we prefer methyl radicals. A range between 10 and 50 cp. at 20° C. is preferred for the viscosity of component (b), and for the value t of the methyl-hydrogen-siloxane units in component (d) the number 3 is preferred. The proportions of the various components (a) to (d) are preferably 10 to 15 g. of (b) and 5 to 10 g. of (c) for each 100 g. of (a), and a sufficient amount of (d) that the calculated molar ratio of

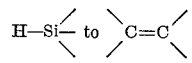

is 1:1.

The viscosity of the non-cross-linked compositions as well as the mechanical values of their elastomeric conversion products can be adjusted to the requirements of their application in each case by the choice of the viscosity of the polysiloxane components (a) and the proportions of the components (a) to (d). An increase in the viscosity of component (a) results in an increase in the tensile strength and in the maximum elongation of the elastomers;

although this viscosity has fundamentally no upper limit, the compositions become, however, too viscous above $10^5$ cp. to be used satisfactorily for pourable sealing purposes. By varying the proportions of components (b) and (c) the Shore hardness of the elastomers can be varied to a considerable extent, although the afore-mentioned limits of the concentration ranges should be adhered to since above them the cross-linked products approach the known unsuitable behaviour of rigid resins, whereas below said limits they adopt the properties of soft gels and their tensile strength considerably decreases.

The conversion of the organopolysiloxane compositions of the invention into elastomers takes place even at room temperature upon addition of a catalyst, platinum compounds, e.g. Pt $Cl_6H_2$, being known as suitable catalysts; the speed of conversion can be controlled to a large extent by the type and amount of the catalyst used. A reaction product of chloroplatinic acid and n-octanol is preferably used. The minimum amount is approximately 1 mg. Pt per 1 kg. of the composition; as a rule, an amount between 5 and 10 mg. Pt per kg. composition should be chosen. The casting compositions so prepared then remain fluid for a period of time which can be adjusted to between one hour and several days. The course of the conversion can be substantially accelerated by heating; the final state is reached at 50° C. after some hours, at 100° C. after approximately one hour, or at 150° C. after a few minutes.

Since the casting compositions are produced by simply mixing together their five components, they can be adjusted to an optimum extent to the purpose of application in each case at the place of such application by the choice of the mixing proportions, without the use of any special apparatus.

The compositions of the invention have the advantage that their components (a) to (d) can be obtained in the most simple and reproducible manner by known methods from commercially available raw materials. The polysiloxanes (a) and (b) are obtained by equilibration of a mixture of cyclic polydiorganosiloxanes and vinyl- or allyl-substituted hexaorganodisiloxanes; the polysiloxane (d) is obtained by hydrolysis of a mixture of monomethyl-dichlorosilane and trimethyl-chlorosilane, and equilibration of the hydrolysate; and the cyclosiloxanes (c) are obtained by hydrolysis of an allylmethylsilane derivative containing two hydrolytically splittable substituents, e.g. allylmethyldiethoxysilane. If the process for producing the cyclosiloxanes (c) is carried out in known manner in such a way that the organosilane is always present in excess up to the end of the reaction, then it is certain that not less than 50% of cyclic tri- and tetrasiloxanes are obtained in the hydrolysate. An additional content of openchain siloxanes, we have found, does not impair the satisfactory properties of the casting compositions.

It was not to be expected that mixtures of the special constitution described above would yield clear elastomers not only with excellent electrical properties but also with good mechanical properties, and this must be regarded as extremely surprising, since mixtures of a very similar constitution lead to substantially worse results, for example with regard to tensile strength. Thus, for example, a conversion is not possible at low temperatures, or the end products obtained do not show the characteristic properties of elastomers, if the vinyl radicals in the component (a) are replaced by allyl radicals, or the methyl-diallyl siloxane units in the component (b) are replaced by allyl-dimethyl-siloxane or vinyl-dimethyl-siloxane units, or the allyl radicals in the component (c) are replaced by vinyl radicals, or if several of these variations are carried out. If in the component (d) the value $t$ is chosen substantially smaller than 2 or greater than 5, then the end products are unsatisfactory from a mechanical point of view.

The following examples are given for the purpose of illustrating the invention. In the examples "parts" are "parts by weight," and cp. means viscosity in centipoises at 20° C.

EXAMPLE 1

100 parts $\alpha,\omega$-bis-(vinyl-dimethylsiloxy)-polydimethyl-siloxane of 15,000 cp. are mixed with 10 parts $\alpha,\omega$-bis-(methyldiallylsiloxy)-polydimethyl-siloxane of 30 cp. 10 parts tetraallyl-tetramethyl-cyclotetrasiloxane and 15 parts methyl-hydrogensiloxane of the mean formula

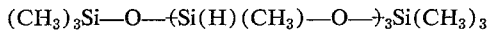
$(CH_3)_3Si-O-(Si(H)(CH_3)-O-)_3Si(CH_3)_3$ $\frac{1}{1000}$ part Pt is added thereto in the form of a reaction product of chloroplatinic acid and n-octanol and, after intimate mixing, the resultant casting composition is freed from air bubbles by a brief reduction of pressure.

Samples of this casting composition were kept at the temperature indicated in each case in the table below and resulted, after termination of the periods of time therein specified, in clear, transparent, rubber-elastic test specimens whose mechanical values H=Shore hardness A, and Z=tensile strength in kg./cm.$^2$ were measured.

|  | 20° C. | | 50° C. | | 100° C. | | 150° C. | |
|---|---|---|---|---|---|---|---|---|
|  | Z | H | Z | H | Z | H | Z | H |
| 10 minutes |  |  |  |  | 30 | 35 | 42 | 40 |
| 1 hour |  |  | 5 | 10 | 40 | 40 | 45 | 45 |
| 2 hours |  |  | 20 | 22 | 43 | 44 | 47 | 48 |
| 4 hours | (sticky gel) | | 27 | 30 | 45 | 44 | 47 | 48 |
| 8 hours | 10 | 15 | 33 | 37 | 45 | 44 | 47 | 49 |
| 1 day | 21 | 25 | 40 | 41 | 46 | 47 | 48 | 50 |
| 2 days | 28 | 30 | 42 | 45 | 46 | 48 | 48 | 51 |
| 4 days | 40 | 38 | 45 | 46 | 46 | 48 | 48 | 51 |

After 4 days, the test specimens had an elongation at break between 100 and 160%.

EXAMPLES 2 TO 10

The following nine examples show the results of using different proportions of the same mixing components. The component (a) to (d) used for this purpose are the following:

(a) $\alpha,\omega$ - Bis - (vinyl - dimethylsiloxy) - polydimethyl-siloxane of 15,000 cp.;

(b) $\alpha,\omega$ - Bis - (methyl - diallylsiloxy) - polydimethyl-siloxane of 35 cp.;

(c) A mixture of cyclic and hydroxyl-terminated, linear allylmethylsiloxane polymers with a proportion of approximately 60 percent by weight of triallyl-trimethyl-cyclotrisiloxane and tetraallyl-tetramethyl-cyclotetrasiloxane;

(d) Methyl-hydrogen-siloxane of the formula

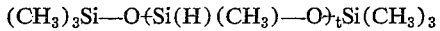
$(CH_3)_3Si-O(Si(H)(CH_3)-O)_tSi(CH_3)_3$ with $t$ on average=3. The proportions of (b), (c) and (d) for every 100 parts of (a) are as follows:

| Example | (b) (parts) | (c) (parts) | (d) (parts) |
|---|---|---|---|
| 2 | 5 | 5 | 7.6 |
| 3 | 5 | 10 | 13.3 |
| 4 | 5 | 15 | 19.1 |
| 5 | 10 | 5 | 8.9 |
| 6 | 10 | 10 | 15.0 |
| 7 | 10 | 15 | 20.4 |
| 8 | 15 | 5 | 10.2 |
| 9 | 15 | 10 | 16.0 |
| 10 | 15 | 15 | 21.7 |

After the addition of $\frac{1}{1000}$ part Pt in the form of the catalyst used in Example 1 and heating at 100° C. for 3 hours, the resulting products had the mechanical test values Z and H (as in Example 1), elongation at break in percent=D and elasticity in percent=E:

| Example | Z | H | D | E |
|---|---|---|---|---|
| 2 | 17 | 30 | 160 | 70 |
| 3 | 29 | 38 | 129 | 61 |
| 4 | 42 | 49 | 116 | 57 |
| 5 | 27 | 34 | 148 | 76 |
| 6 | 44 | 41 | 130 | 63 |
| 7 | 44 | 53 | 109 | 71 |
| 8 | 35 | 34 | 160 | 75 |
| 9 | 34 | 41 | 119 | 69 |
| 10 | 34 | 44 | 97 | 66 |

What is claimed is:

1. An organopolysiloxane composition convertible upon admixture with a platinum catalyst into a clear, transparent elastomer, which comprises (a) 100 parts by weight of an α,ω-bis-(vinyl-dimethylsiloxy)-polydiorganosiloxane of the formula

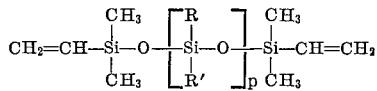

in which R and R' are independently selected from the group consisting of hydrocarbon radicals which are free from aliphatic multiple bonds, and halogen derivatives thereof, and $p$ is a number having a value such that the viscosity of the polysiloxane is at least 1000 cp. at 20° C.;

(b) 5 to 15 parts by weight of an α,ω-bis-(methyl-diallylsiloxy)-polydiorganosiloxane of the formula

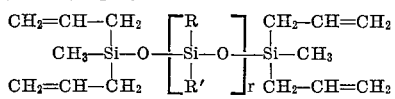

in which R and R' are as above and $r$ is a number having a value such that the polysiloxane has a viscosity between 5 and 200 cp. at 20° C.;

(c) 5 to 15 parts by weight of an allyl-methyl-cyclo-polysiloxane of the formula

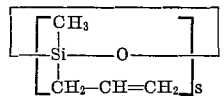

in which $s$ in an integer from 3 to 4; and (d) an α,ω-bis-(trimethylsiloxy)-polymethyl-hydrogen-siloxane of the formula

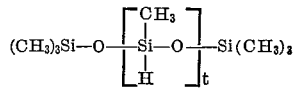

in which $t$ is an integer from 2 to 5, in such an amount that the molar ratio of the HSi(CH$_3$)O-units to the olefinic hydrocarbon radicals in the whole composition is 0.7:1 to 1.5:1.

2. A composition as claimed in claim 1, in which the component (c) consists of different polymers of allyl-methyl-siloxane units of which at least 50 percent by weight are triallyltrimethyl-trimethyl-cyclotrisiloxane and tetra-allyl-tetramethyl-cyclotetrasiloxane, and the remaining portions are cyclosiloxanes of 5–7 siloxane units and α,ω-dihydroxypoly-(allyl-methyl-siloxanes) of less than 200 siloxane units.

3. A composition as claimed in claim 1, in which the component (b) has a viscosity between 10 and 50 cp. at 20° C.

4. A composition as claimed in claim 1, in which the hydrocarbon radicals R and R' are methyl radicals.

5. A composition as claimed in claim 1, in which for every 100 parts by weight of component (a) there is present 10 to 15 parts by weight of component (b), 5 to 10 parts by weight of component (c), and sufficient of component (d) that the mol number of the HSi(CH$_3$)O-units is equal to the mol number of the olefinic hydrocarbon radicals in the whole composition.

6. An organopolysiloxane casting composition comprising an organopolysiloxane composition as claimed in claim 1 in admixture with a platinum catalyst.

7. A casting composition as claimed in claim 6 in which the catalyst is the reaction product of chloroplatinic acid and n-octanol.

8. A casting composition as claimed in claim 6 wherein the catalyst is present in an amount such that the casting composition contains at least 1 mg. platinum per kg. of organopolysiloxane composition.

9. A casting composition as claimed in claim 8 containing between 5 and 10 mg. platinum per kg. of organopolysiloxane composition.

10. An electrical component encapsulated by means of a composition as claimed in claim 1.

References Cited

UNITED STATES PATENTS

| | | | |
|---|---|---|---|
| 3,020,260 | 2/1962 | Nelson | 260—825 |
| 3,284,406 | 11/1966 | Nelson | 260—825 |
| 3,436,366 | 4/1969 | Modic | 260—825 |

SAMUEL H. BLECH, Primary Examiner